United States Patent
Lathrop (10) Patent No.: US 10,118,490 B2
(45) Date of Patent: Nov. 6, 2018

(54) TOUCH-PAD INTEGRATED STEERING WHEEL FOR A MOTOR VEHICLE

(75) Inventor: William Brian Lathrop, San Jose, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 57 days.

(21) Appl. No.: 12/848,695

(22) Filed: Aug. 2, 2010

(65) Prior Publication Data

US 2011/0030502 A1    Feb. 10, 2011

Related U.S. Application Data (60) Provisional application No. 61/231,880, filed on Aug. 6, 2009.

(51) Int. Cl.
*B60K 37/06*    (2006.01)

(52) U.S. Cl.
CPC ........ *B60K 37/06* (2013.01); *B60K 2350/928* (2013.01); *Y10T 74/20834* (2015.01)

(58) Field of Classification Search
CPC ................................................ B60K 2350/928
USPC .......................................................... 74/552
See application file for complete search history.

(56) References Cited

U.S. PATENT DOCUMENTS

| | | | |
|---|---|---|---|
| 4,518,836 A * | 5/1985 | Wooldridge | 200/61.54 |
| 5,270,689 A | 12/1993 | Hermann | |
| 5,844,547 A | 12/1998 | Minakuchi et al. | |
| 5,847,664 A * | 12/1998 | Zamplas et al. | 341/20 |
| 6,819,990 B2 * | 11/2004 | Ichinose | 701/36 |
| 7,126,583 B1 | 10/2006 | Breed | |
| 7,295,904 B2 * | 11/2007 | Kanevsky et al. | 701/36 |
| 7,441,800 B2 | 10/2008 | Weber et al. | |
| 7,489,303 B1 | 2/2009 | Pryor | |
| 8,307,302 B2 | 11/2012 | Takaki | |
| 2001/0054326 A1 * | 12/2001 | Onodera et al. | 74/552 |
| 2002/0145593 A1 * | 10/2002 | Boyd et al. | 345/173 |
| 2002/0158838 A1 | 10/2002 | Smith et al. | |
| 2003/0043114 A1 | 3/2003 | Silfverberg et al. | |
| 2003/0043174 A1 | 3/2003 | Hinckley et al. | |
| 2005/0024344 A1 | 2/2005 | Trachte | |
| 2005/0189159 A1 * | 9/2005 | Weber et al. | 180/315 |
| 2005/0273218 A1 | 12/2005 | Breed et al. | |
| 2006/0047386 A1 | 3/2006 | Kanvesky et al. | |
| 2006/0162485 A1 * | 7/2006 | Leng et al. | 74/552 |
| 2008/0174570 A1 | 7/2008 | Jobs et al. | |
| 2009/0174687 A1 * | 7/2009 | Ciesla | G06F 3/04886 345/174 |
| 2009/0262083 A1 * | 10/2009 | Parekh | 345/173 |

(Continued)

FOREIGN PATENT DOCUMENTS

| | | |
|---|---|---|
| DE | 200 20 227 | 4/2001 |
| DE | 101 39 693 | 5/2002 |

(Continued)

OTHER PUBLICATIONS

U.S. Appl. No. 61/149,523, filed Feb. 3, 2009, (certified English-language translation provided).
U.S. Appl. No. 12/699,689, filed Feb. 3, 2010.

*Primary Examiner* — Vicky A Johnson
(74) *Attorney, Agent, or Firm* — Hunton Andrews Kurth LLP (57) ABSTRACT

A motor vehicle includes a steering wheel and a touchpad integrated into the steering wheel, situated in a channel, and adapted to input commands.

29 Claims, 9 Drawing Sheets

(56) References Cited

U.S. PATENT DOCUMENTS

| | | | |
|---|---|---|---|
| 2010/0188343 | A1 | 7/2010 | Bach |
| 2010/0268426 | A1* | 10/2010 | Pathak et al. ............... 701/48 |
| 2010/0269038 | A1 | 10/2010 | Tsuda |
| 2011/0291997 | A1* | 12/2011 | Fei .................... G06F 3/041 |
| | | | 345/178 |

FOREIGN PATENT DOCUMENTS

| | | |
|---|---|---|
| DE | 103 18 713 | 12/2003 |
| DE | 10318713 A1 * | 12/2003 |
| DE | 10 2004 007 253 | 6/2005 |
| DE | 10 2006 019 065 | 10/2007 |
| DE | 10 2006 024 252 | 1/2008 |
| EP | 0 366 132 | 5/1990 |
| EP | 0 612 292 | 8/1994 |
| EP | 1 286 861 | 3/2003 |
| EP | 1 679 221 | 7/2006 |
| WO | WO 2005/025942 | 3/2005 |

\* cited by examiner

TOUCH-PAD INTEGRATED STEERING WHEEL FOR A MOTOR VEHICLE

CROSS-REFERENCE TO RELATED APPLICATIONS

The present application claims the benefit of U.S. Provisional Patent Application No. 61/231,880, filed on Aug. 6, 2009, which is expressly incorporated herein in its entirety by reference thereto.

The present application is related to U.S. patent application Ser. No. 12/848,657, filed on the even date herewith, entitled "Motor Vehicle," which is expressly incorporated herein in its entirety by reference thereto.

FIELD OF THE INVENTION

The present invention relates to a motor vehicle, e.g., having a steering wheel and a touchpad integrated into the steering wheel for inputting commands.

BACKGROUND INFORMATION

According to German Published Patent Application No. 101 39 693, in modern electronic devices in a vehicle that constantly offer additional functions with more and more options, multi-function operating elements, by which various functions of the connected devices can be controlled, have been created because of the limited installation space for the associated operating elements. Thus, European Patent No. 0 366 132 describes, for example, a multifunction operating device for motor vehicles, in which function groups and individual functions are selected with the aid of a rotary switch, and in which an ENTER function can be triggered. One and the same bidirectional rotary switch is used for selecting menus and individual functions.

German Published Utility Model No. 200 20 227 discloses a motor vehicle steering wheel having two operating elements fixed on the steering wheel for controlling vehicle functions in a vehicle, the operating elements including respectively a touch-sensitive sensor surface, which produces an electronic signal when touched.

U.S. Provisional Patent Application No. 61/149,523 describes a motor vehicle having a steering wheel, the motor vehicle including a first display integrated into the steering wheel for variably displaying information, a first touch screen situated above the first display for inputting commands, a second display integrated into the steering wheel so as to be spatially separated from the first display for variably displaying information, and a second touch screen situated above the second display for inputting commands.

U.S. Published Patent Application No. 2008/0174570 describes a method for gesture recognition.

U.S. patent application Ser. No. 12/699,689 describes a motor vehicle having a steering wheel, the motor vehicle including a first display integrated into the steering wheel for variably displaying information, a first touch screen situated above the first display for inputting commands, a second display integrated into the steering wheel so as to be spatially separated from the first display for variably displaying information, and a second touch screen situated above the second display for inputting commands.

Two steering wheel rockers are provided for a steering wheel of a VW Golf, by which a map detail may be zoomed.

German Published Patent Application No. 10 2006 024 252 discloses a vehicle cockpit having a vehicle steering wheel that has an outer surface that is accessible to a user, the steering wheel being arranged such that via the steering wheel it is possible to detect finger movements on the outer surface of the steering wheel, an evaluation circuit for generating evaluation signals being provided, which as such are correlated with the finger movement and the position of the finger on the steering wheel.

German Published Patent Application No. 10 2004 007 253 discloses a steering wheel for a motor vehicle having a hub body, a steering wheel rim, at least one steering wheel spoke for fastening the steering wheel rim on the hub body, and at least one reflection-optical sensor device situated on the hub body, on the steering wheel rim or on the steering wheel spoke for controlling and/or regulating a module of a motor vehicle.

German Published Patent Application No. 10 2006 019 065 discloses an input interface for a vehicle cockpit, which includes a switch lever, the switch lever having a knob end that forms a finger support surface, a detection device being provided for generating an output signal in accordance with the position of a finger on the finger support surface.

European Patent No. 1 286 861 discloses a safety device and at least one driver-operable device, which may be used in a motor vehicle, each driver-operable device comprising a manually operable operating element and a display window, the safety device including a memory for storing a graphically almost exact copy image of an operating element of a driver-operable device and a head-up display for projecting a head-up display image of the mentioned graphically almost exact copy image, a plurality of finger position detection sensors being provided for continuously tracking the current position of a finger tip of the driver.

PCT Published Patent Application No. WO 2005/025942 discloses a capacitive touch sensor in a motor vehicle.

Steering wheel-based operating devices are disclosed, for example, in U.S. Pat. No. 7,126,583, U.S. Pat. No. 6,819,990, U.S. Patent Application Publication No. 2006/0047386, German Published Patent Application No. 103 18 713, European Published Patent Application No. 1 679 221, and European Patent No. 0 612 292.

SUMMARY

Example embodiments of the present invention improve and/or simplify the operator control of a motor vehicle. For this purpose, it is particularly desirable that the driver is not distracted from traffic events even when operating complex devices. In particular, the control operation of a motor vehicle should be able to be performed very quickly.

According to example embodiments of the present invention, a motor vehicle includes a steering wheel and a touchpad integrated into the steering wheel and situated in a channel being provided for inputting commands. A touchpad may include a (e.g., resistively or capacitively) touch-sensitive surface. In particular, there is a provision that no display is provided underneath the touchpad. A touchpad may be non-transparent. A touchpad may be particular opaque. A touchpad may be slightly translucent such that in particular—in particular at least in parts—it may be illuminated or is illuminable from below.

A channel may be an elongated hollow. A channel may be a depression and/or a depression created by an elevation situated on its edge, the length of which is at least three times its width. Positioning a touchpad in a channel is similar to a channel-shaped design of the touchpad and/or to a channel formed by the touchpad.

The touchpad may be shaped concavely or may form a concavely shaped bottom surface of the channel. In this instance, the bottom surface extends, e.g., continuously. In particular, the touchpad is provided to be concavely shaped at a radius of curvature between 5 mm and 40 mm or to form a bottom surface of the channel having this radius of curvature.

The course of the channel or the touchpad may have a curvature. The curvature may open downward when the steering wheel is directed straight ahead. The curvature may have an angle of opening between 120° and 140°. The curvature may open downward when the steering wheel is directed straight ahead. The course of the channel or the touchpad may be at least one of (a) boomerang-shaped, (b) banana-shaped, and (c) v-shaped.

The course of the channel or the touchpad may have a (in particular straight) section that is inclined between 2° and 20° with respect to the horizontal when the steering wheel is directed straight ahead. The course of the channel or the touchpad extending outward may slope downward when the steering wheel is directed straight ahead. In this instance, extending outward means, e.g., toward the edge of the steering wheel. The course of the channel or the touchpad may include a (in particular straight) section that slopes downward toward the outside when the steering wheel is directed straight ahead. The course of the channel or the touchpad may include a first (in particular straight) section and at least one second (in particular straight) section separated by the curvature from the first (in particular straight) section. The first (in particular straight) section may be inclined between 2° and 20° with respect to the horizontal when the steering wheel is directed straight ahead. The first (in particular straight) section may be situated above the second (in particular straight) section when the steering wheel is directed straight ahead.

The channel may be between 65 mm and 45 mm long. The channel may be between 20 mm and 10 mm wide.

The touchpad may have a grain, a surface structure, a structure, or a texture. The grain, the surface structure, the structure, or the texture may be at least one of (a) rhombic, (b) square, and (b) rectangular. The grain, the surface structure, the structure, or the texture may include dents. The grain, the surface structure, the structure, or the texture may include at least one group of bulges or (convex) dents. There may be a provision to provide LEDs below the bulges or dents for illuminating the bulges or dents.

The touchpad may be situated in the lateral region of the steering wheel. In this instance, there is in particular a provision that no part of the touchpad is situated more than 15 cm from the edge of the steering wheel. In particular, there is a provision that the center or the curvature of the touchpad is situated no more than 10 cm from the edge of the steering wheel.

The motor vehicle may include an actuator for producing a haptic feedback when touching the first touchpad. The motor vehicle may include a second actuator for producing a haptic feedback when touching the second touchpad.

According to example embodiments of the present invention, a motor vehicle includes a steering wheel, a first touchpad integrated into the steering wheel and situated in a first channel being provided for inputting commands, and a second touchpad integrated into the steering wheel so as to be spatially separated from the first touchpad and situated in a second channel being provided for inputting commands. There is in particular a provision for the first touchpad and/or the second touchpad to be arranged in accordance with the aforementioned touchpad and/or for the first channel and/or the second channel to be arranged in accordance with the aforementioned channel.

The course of the first channel or the first touchpad may be in a mirror image of the course of the second channel or the second touchpad. The mirror axis extends, for example, through the center point or the hub of the steering wheel, in what is the longitudinal direction of the motor vehicle when the steering wheel is directed straight ahead.

The first touchpad may be situated in the left lateral region of the steering wheel. In this instance, there is in particular a provision that no part of the first touchpad is situated more than 15 cm from the edge of the steering wheel. In particular, there is a provision that the center or the curvature of the first touchpad is situated no more than 10 cm from the edge of the steering wheel. The course of the first channel or the first touchpad may include a curvature, which opens to the right downward when the steering wheel is directed straight ahead. The second touchpad may be situated in the right lateral region of the steering wheel. In this instance, there is in particular a provision that no part of the second touchpad is situated more than 15 cm from the edge of the steering wheel. In particular, there is a provision that the center or the curvature of the second touchpad is situated no more than 10 cm from the edge of the steering wheel. The course of the second channel or the second touchpad may include a curvature, which opens to the left downward when the steering wheel is directed straight ahead.

The motor vehicle may include a coordination module for generating a command for operating a function of the motor vehicle as a function of a touching motion over the first touchpad and a simultaneously occurring touching motion over the second touchpad. A function of a motor vehicle may include the receiving frequency of a radio, the volume of an acoustic output in the motor vehicle, a sound adjustment (type and balance), a selection of a map detail, a title selection, a selection of a destination and/or a temperature adjustment, etc. A function of a motor vehicle may include a function for which a setpoint value is to be met from a selection of, in particular continuous, values. A function of a motor vehicle may include a function that is adjustable in analog fashion, in particular following a scale. The function of the motor vehicle may include scrolling through a list. The function of the motor vehicle may include shifting a map detail. The function of the motor vehicle may include scaling a map detail. The function of the motor vehicle may include moving an element represented on the display.

The motor vehicle may include a first actuator for producing a haptic feedback when touching the first touchpad. The motor vehicle may include a second actuator for producing a haptic feedback when touching the second touchpad.

The motor vehicle may include a display (spatially separated from the touchpad) for representing a map detail, the map detail being scalable and/or shiftable as a function of a touching motion over the first touchpad and a simultaneously occurring touching motion over the second touchpad. The map detail may be enlarged as a function of a touching motion over the first touchpad directed toward the edge of the steering wheel and a simultaneously occurring touching motion over the second touchpad directed toward the edge of the steering wheel. The map detail may be reduced as a function of a touching motion over the first touchpad directed toward the center of the steering wheel and a simultaneously occurring touching motion over the second touchpad directed toward the center of the steering wheel. The map detail may be enlarged as a function of a touching motion over the first touchpad directed toward the left and a simultaneously occurring touching motion over the second touchpad directed toward the right. The map detail may be reduced as a function of a touching motion over the first touchpad directed toward the right and a simultaneously occurring touching motion over the second touchpad directed toward the left.

A display may be a head-up display for example. A display is, for example, a display situated in an instrument cluster for the variable representation of information. Such a display may be situated for example between two analog instruments in the instrument cluster. A display may be a TFT or a TFT-like display.

The map detail may be shifted in the direction of a touching motion over the first touchpad directed toward the edge of the steering wheel as a function of a touching motion over the first touchpad directed toward the edge of the steering wheel and a simultaneously occurring touching motion over the second touchpad directed toward the center of the steering wheel. The map detail may be shifted in the direction of the touching motion over the first touchpad directed toward the center of the steering wheel as a function of a touching motion over the first touchpad directed toward the center of the steering wheel and a simultaneously occurring touching motion over the second touchpad directed toward the edge of the steering wheel. The map detail may be shifted to the left as a function of a touching motion over the first touchpad directed toward the left and a simultaneously occurring touching motion over the second touchpad directed toward the left. The map detail may be shifted to the right as a function of a touching motion over the first touchpad directed toward the right and a simultaneously occurring touching motion over the second touchpad directed toward the right.

The map detail may be shifted downward as a function of a downwardly directed touching motion over the first touchpad and a simultaneously occurring downwardly directed touching motion over the second touchpad. The map detail may be shifted upward as a function of an upwardly directed touching motion over the first touchpad and a simultaneously occurring upwardly directed touching motion over the second touchpad.

The motor vehicle may include a display for representing a list of selectable list entries, it being possible to scroll through the list at a first scrolling speed as a function of a touching motion over the first touchpad through the list, it being possible to scroll through the list at a second scrolling speed as a function of a touching motion over the first touchpad and a simultaneously occurring touching motion over the second touchpad, the second scrolling speed being greater than the first scrolling speed.

A list entry may be a telephone number or a telephone book entry for example. A list entry may be an icon or symbol and/or an entry for calling up a submenu. A list entry may also be a click-stop position of a scale. Thus, a list entry may be, for example, a click-stop position for setting a volume or a station. A list entry may be a digital incremental step. Thus, a list entry may be, for example, a natural number, e.g., for indicating a temperature if a temperature selection is made in whole numbers. Thus, a list entry may be the setpoint temperature of 21° C., for example. Examples of list entries are shown in FIGS. 6, 7, and 9 of German Published Patent Application No. 101 39 693, for example. German Published Patent Application No. 101 39 693 is expressly incorporated herein in its entirety by reference thereto.

A list may also be an arrangement of operating elements. By the aforementioned scrolling it is possible to change the displayed range of a list and/or to select or mark a list entry. By scrolling, it is possible, for example, to shift the marking (for the activation or selection) of the word telephone number shown in FIG. 6 of German Published Patent Application No. 101 39 693 downward or upward. By scrolling, it is possible, for example, to shift a marking, an activation or a selection for list entries. Furthermore, additional list entries may be displayed by scrolling. There may be a provision for a list entry to be selected by pressing onto one of the touchpads.

A method is for operating a motor vehicle—in particular a motor vehicle including one or more of the aforementioned features—having a steering wheel, the motor vehicle including a first touchpad for inputting commands integrated into the steering wheel and a second touchpad for inputting commands integrated into the steering wheel so as to be spatially separated from the first touchpad, and a command (distinct from a command generated by touching or by a touching motion of only one touchpad) for operating a function of the motor vehicle being generated or produced as a function of the touching motion (or a direction of the touching motion) over the first touchpad and the simultaneously occurring touching motion (or a direction of the touching motion) over the second touchpad.

Example embodiments of the present invention may be used, e.g., in combination with infotainment applications, navigation applications, vehicle settings, driver assistance applications, communications applications (telephone, e-mail, instant messages, blogging, etc.), digital photography, digital video recording, web browsing, etc.

A motor vehicle is, for example, a land vehicle that may be used individually in road traffic. However, motor vehicles are not restricted to land vehicles having an internal combustion engine.

Further features and aspects of example embodiments of the present invention are described in more detail below with reference to the appended Figures.

DETAILED DESCRIPTION

Figure 1:
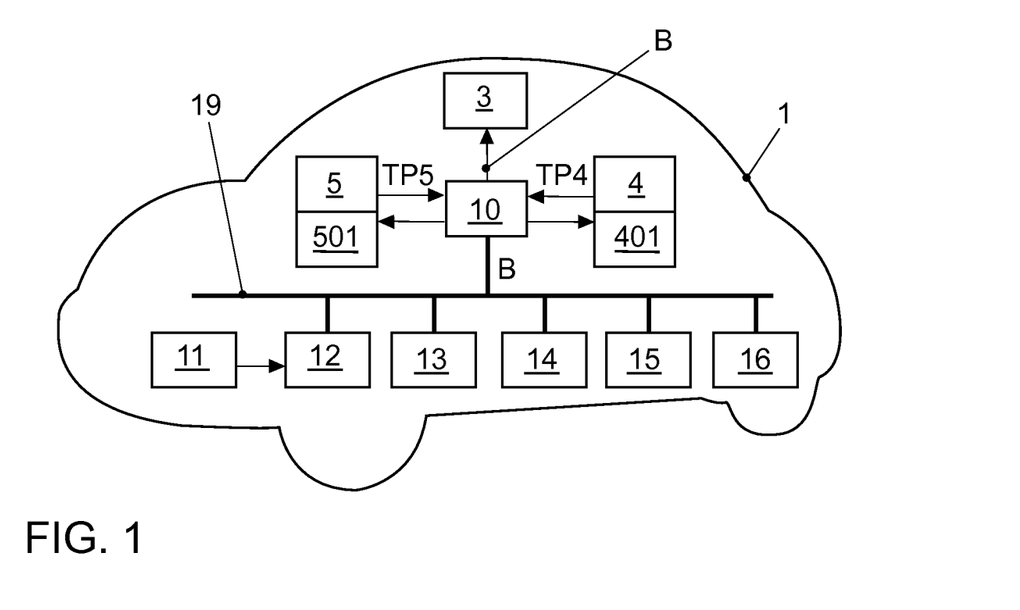
FIG. 1 schematically illustrates an exemplary embodiment of a motor vehicle.
Figure 2:
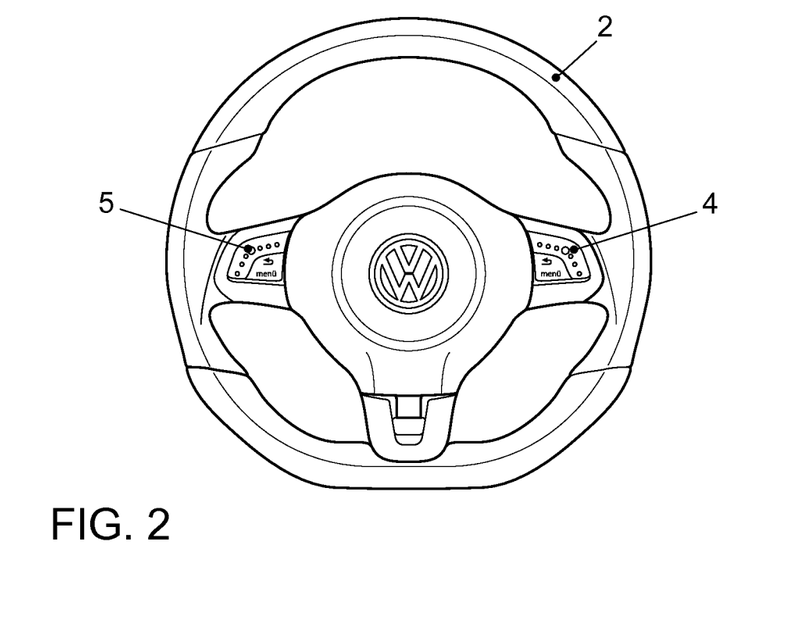
FIG. 2 shows an exemplary embodiment of a steering wheel of the motor vehicle represented in FIG. 1.

FIG. 1 schematically illustrates shows a motor vehicle 1. Motor vehicle 1 has a steering wheel 2 represented in FIG. 2, which includes on its left and right edge respectively a touchpad 5 for inputting commands and a touchpad 4 for inputting commands, touchpad 5 being arranged and situated in a mirror image with respect to touchpad 4.

Figure 3:
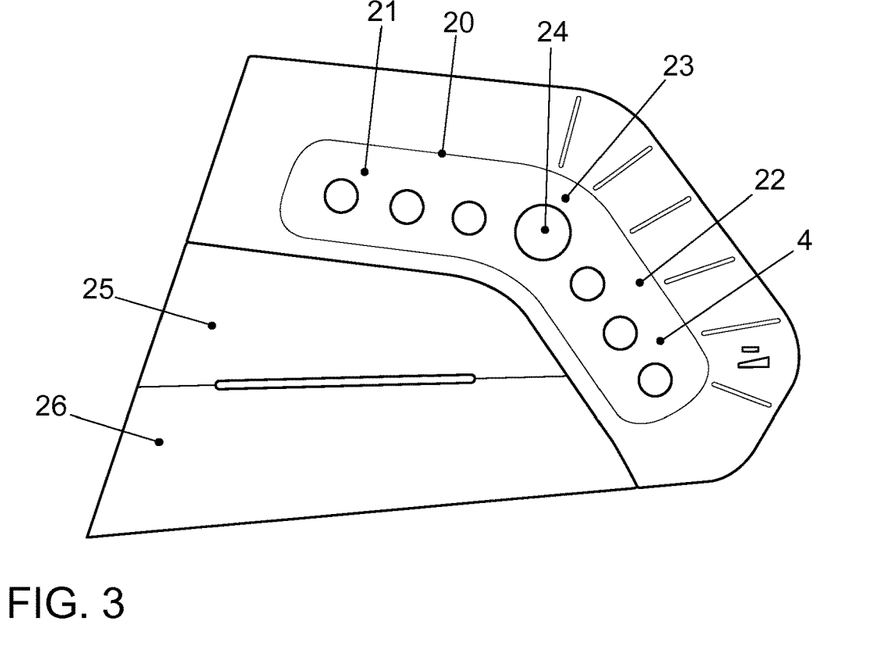
FIG. 3 shows an exemplary embodiment of an operating cluster.
Figure 4:
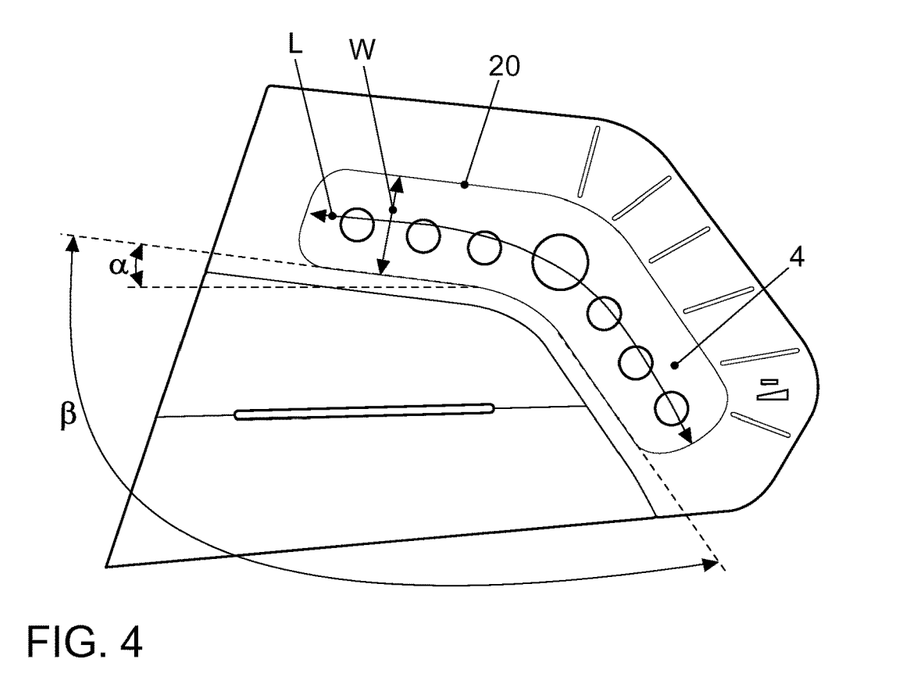
FIG. 4 shows an exemplary embodiment for a dimensioning of the operating cluster represented in FIG. 3.

FIG. 3 and FIG. 4 show an operating cluster of steering wheel 2, in which touchpad 4 and two operating elements 25 and 26 are integrated. In this instance, touchpad 4 is situated in a channel 20 having a concavely curved bottom surface. The course of channel 20 or touchpad 4 has a straight section 21, which is connected to another straight section 22 via a curvature 23 or a curved region such that channel 200 is arranged or formed or curved in boomerang-shaped or a v-shaped fashion.

Channel 20 represented in the present exemplary embodiment has a length L of 53 mm and a width W of 15 mm. Section 21 is inclined by an angle of incline α=10° with respect to the horizontal. The opening angle β of the course of channel 20 is 130°.

Touchpad 4 has a rhombic texture. In addition, touchpad 4 has convex dents 24, touchpad 4 being underlaid in the region of convex dents 24 with LEDs 401 for illuminating dent 24. Reference numeral 501 in FIG. 1 indicates analog LEDs for touchpad 5.

Figure 5:
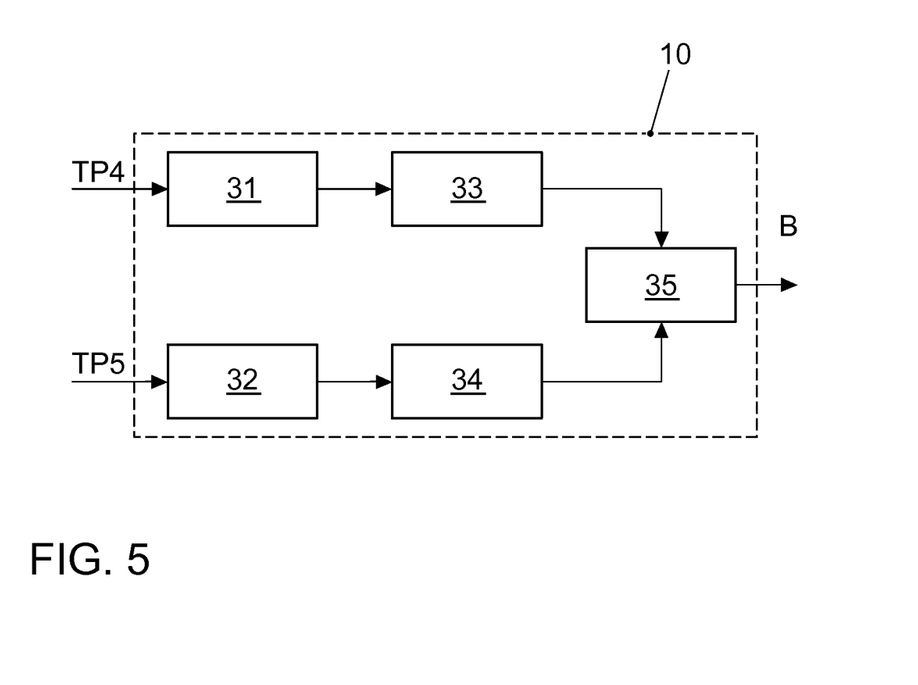
FIG. 5 shows an exemplary embodiment of a control system.

In addition, motor vehicle 1 includes a control system 10 for controlling a display 3 and for evaluating the output signals TP4 and TP5 of touchpads 4 and 5. FIG. 5 shows a detailed representation of control system 10. Control system 10 includes an interface 31 for reading in an output signal TP4 of touchpad 4 and an interface 32 for reading in output signal TP5 of touchpad 5. Evaluation modules 33 and 34 for evaluating output signals TP4 and TP5 of touchpads 4 and 5 are connected to interfaces 31 and 32. The output signals of these evaluation modules 33 and 34 are input signals into a coordination module 35 for generating a command B for operating a function of motor vehicle 1 as a function of the output signals of evaluation modules 33 and 34.

Via a bus system 19, control system 10 is connected to a Bluetooth interface 12, a navigation system 13, an automatic climate control 14, an infotainment system 15, and a vehicle control unit 16. Using touchpads 4 and 5, it is possible to operate—by appropriate commands B—for example navigation system 13, automatic climate control 14, infotainment system 15, vehicle control unit 16, and—via Bluetooth interface 12—a mobile telephone 11. For operating motor vehicle 1 or functions of motor vehicle 1 such as navigation system 13, automatic climate control 14, infotainment system 15, or a distance control system, which may be implemented in vehicle control unit 16 for example, a higher-order menu is represented by a display 3, which is operable using touchpads 4 and 5.

FIG. 3 shows an alternative arrangement of a steering wheel 102. There may be a provision to use steering wheel 102 instead of steering wheel 2. Steering wheel 102 includes a touchpad 104 corresponding to touchpad 4 and a touchpad 105 corresponding to touchpad 5.

Figure 6:
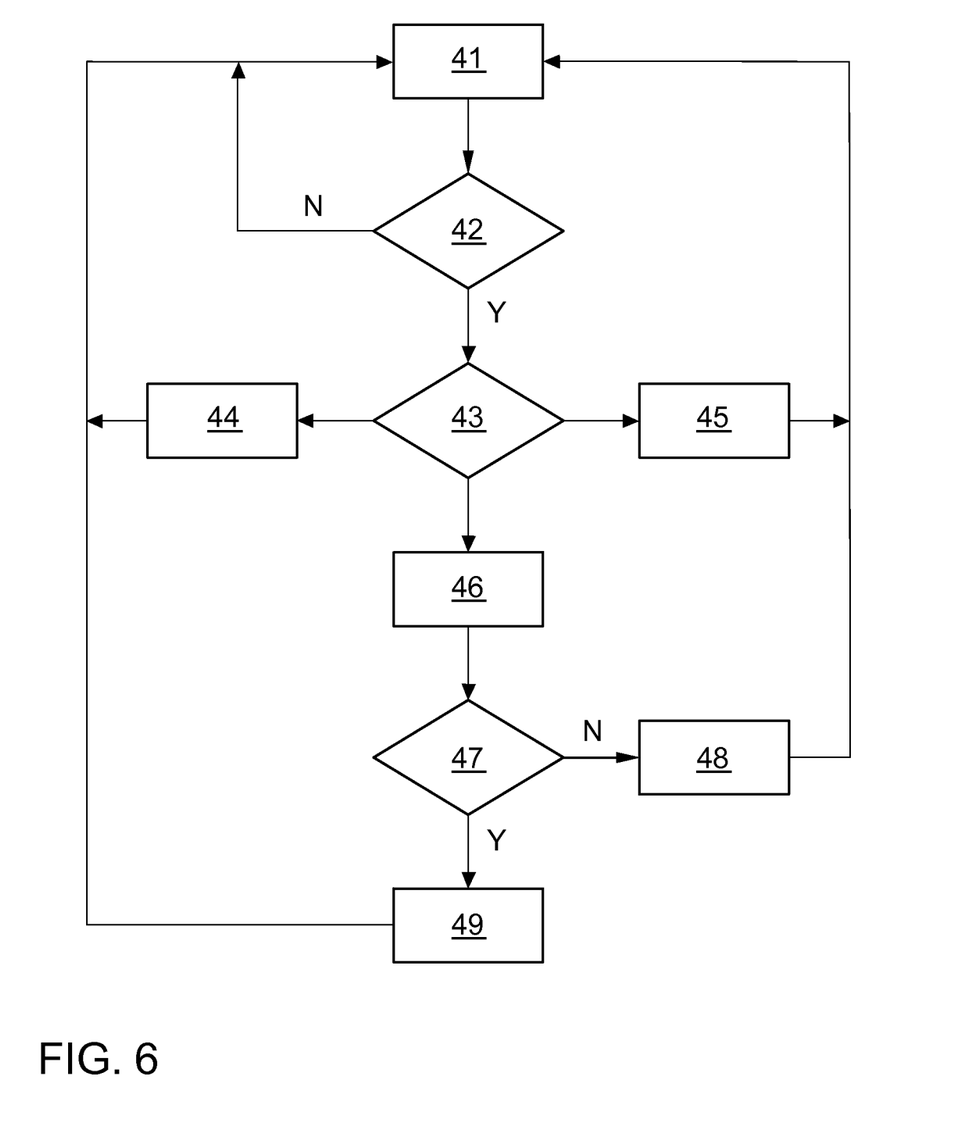
FIG. 6 shows a method implementable in an evaluation module.

FIG. 6 shows an exemplary embodiment of a method implemented in evaluation modules 33 and 34, which is described in the following with reference to evaluation module 33. The method starts with a step 41, in which the output signal of interface 31 is read in. Step 41 is followed by a query 42 to determine whether a touch of touchpad 4 has been detected. If no touch of touchpad 4 has been detected, then query 42 is again followed by step 41. Otherwise, query 42 is followed by a query 43 for ascertaining the type of touch.

If query 43 detects a withdrawal from touchpad 4, then query 43 is followed by a step 44, in which a command associated with this withdrawal is generated. Furthermore, a memory, in which coordinates of a previously performed touch are stored, is deleted in step 44. Step 44 in turn is followed by step 41. If query 43 detects a pressing action on touchpad 4, then a command associated with the pressing action on touchpad 4 is generated. Step 45 in turn is followed by step 41. If query 43 detects a touching motion over touchpad 4, then query 43 is followed by a step 46, in which the distance from a previously detected touch point is detected.

Step 46 is followed by a query 47 as to whether the distance exceeds a specific threshold value. If the distance does not exceed this specific threshold value, then query 47 is followed by a step 48, in which the coordinates of the touch are stored. Otherwise, query 47 is followed by a step 49, in which a trajectory of the touching motion is output. Steps 48 and 49 are again followed by step 41.

Figure 7:
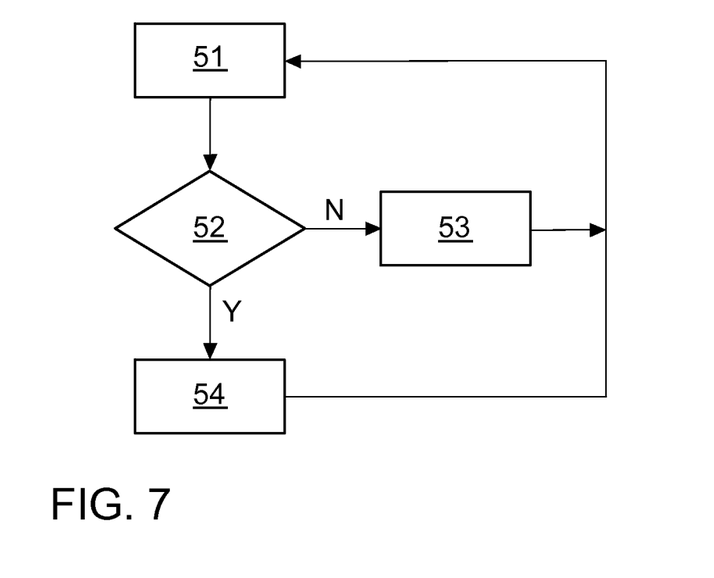
FIG. 7 shows a method implementable in a coordination module.

FIG. 7 shows a method implemented in coordination module 35. For this purpose, in a step 51, the output signals of evaluation modules 33 and 34 are first read in. Step 51 is followed by a query 52 as to whether a simultaneous touching motion over touchpads 4 and 5 occurs. If a touching motion over touchpad 4 occurs simultaneously with a touching motion over touchpad 5, then query 52 is followed by a step 54, in which a command is generated for operating a function of motor vehicle 1 as a function of the direction of the touching motion over touchpad 4 and the direction of the touching motion over touchpad 5. If there is no simultaneous touching motion over touchpads 4 and 5, then query 52 is followed by a step 53, in which a command possibly generated in accordance with the method described in FIG. 6 is output. Steps 53 and 54 are again followed by step 51.

The following table shows the commands generated by steps 53 and 54 when a touching motion over touchpads 4 and/or 5 is detected:

| context | input type | touching motion touchpad 5 | touching motion touchpad 4 | command |
|---|---|---|---|---|
| map | simultaneous | outward/ to the left | outward/ to the right | enlarge map (reduce scale) |
| map | simultaneous | inward/ to the right | inward/ to the left | reduce map (increase scale) |
| map | not simultaneous | outward/ to the left | — | rotate map counter-clockwise |
| map | not simultaneous | — | outward/ to the right | rotate map clockwise |
| map | not simultaneous | inward/ to the right | — | rotate map clockwise |
| map | not simultaneous | — | inward/ to the left | rotate map counter-clockwise |
| map | simultaneous | inward/ to the right | outward/ to the right | move map to the right |
| map | simultaneous | outward/ to the left | inward/ to the left | move map to the left |
| map | simultaneous | downward | downward | move map downward or tilt map forward |
| map | simultaneous | upward | upward | move map upward or tilt map backward |
| list | not simultaneous | outward/ to the left | — | scroll to the left or upward |
| list | not simultaneous | — | outward/ to the right | scroll to the right or downward |
| list | not simultaneous | inward/ to the right | — | scroll to the right or downward |
| list | not simultaneous | — | inward/ to the left | scroll to the left or upward |
| list | not simultaneous | downward | — | scroll downward |
| list | not simultaneous | — | downward | scroll downward |

-continued

| context | input type | touching motion touchpad 5 | touching motion touchpad 4 | command |
|---|---|---|---|---|
| list | not simultaneous | upward | — | scroll upward |
| list | not simultaneous | — | upward | scroll upward |
| list | simultaneous | inward/ to the right | outward/ to the right | scroll at increased scrolling speed to the right or downward |
| list | simultaneous | outward/ to the left | inward/ to the left | scroll at increased scrolling speed to the left or upward |
| list | simultaneous | downward | downward | scroll at increased scrolling speed downward |
| list | simultaneous | upward | upward | scroll at increased scrolling speed upward |

Figure 8:
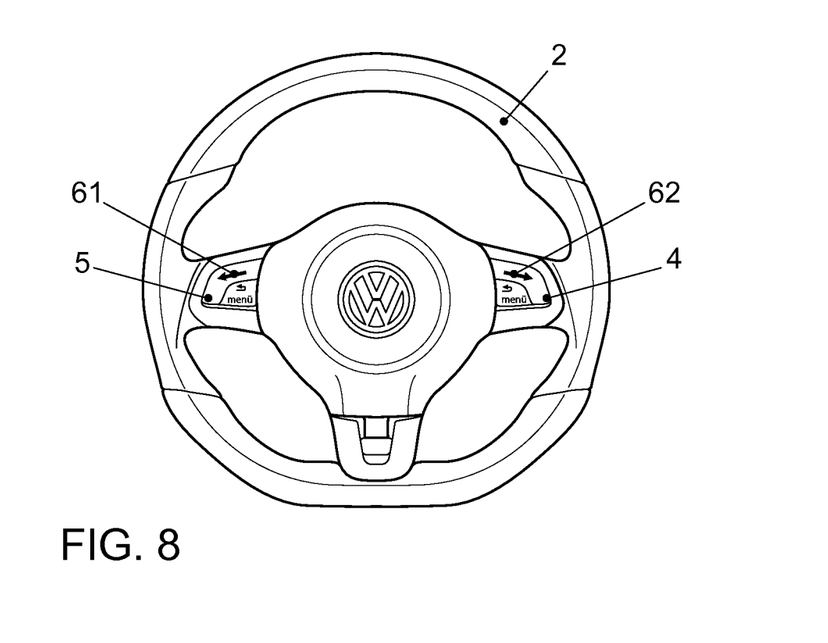
FIG. 8 shows the steering wheel represented in FIG. 2.
Figure 9:
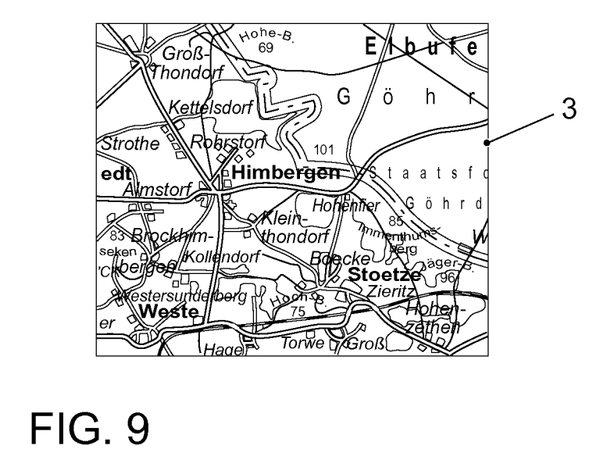
FIG. 9 shows a map detail represented by a display.
Figure 10:
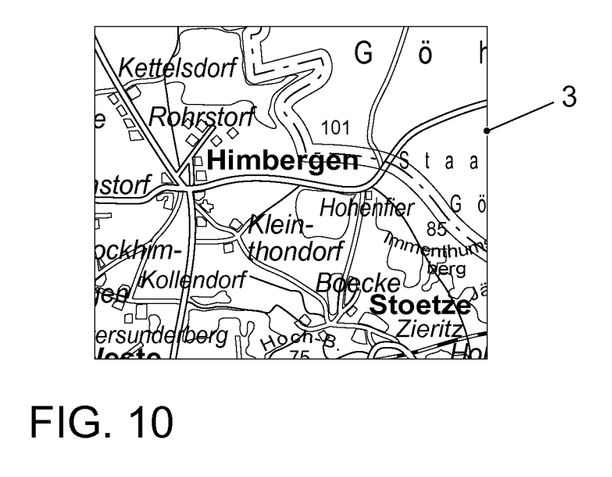
FIG. 10 shows a map detail represented by a display in enlarged fashion.
Figure 11:
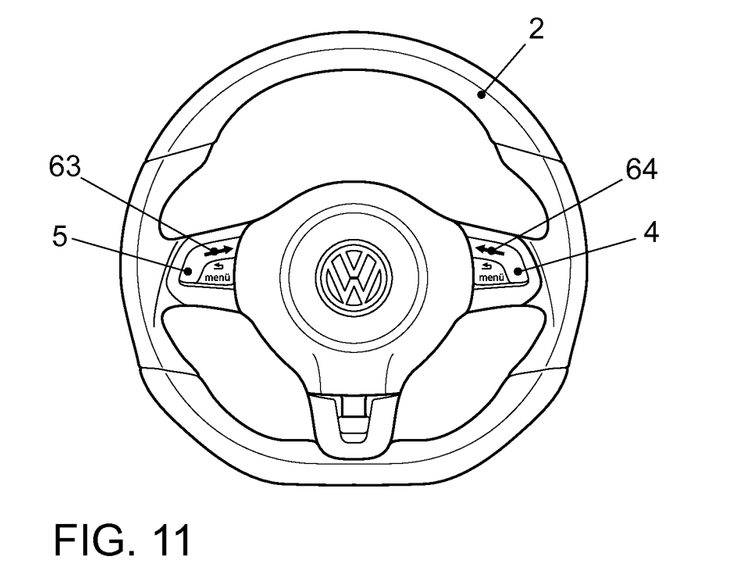
FIG. 11 shows the steering wheel represented in FIG. 2.

If a map detail is represented by display 3 for example, and there is a touching motion over touchpad 5 in the direction of the arrow indicated by reference numeral 61 and there is simultaneously a touching motion over touchpad 4 in the direction of the arrow indicated by reference numeral 62, then the map detail represented by display 3 is enlarged as represented in exemplary fashion in FIGS. 9 and 10. In this instance, FIG. 9 shows the map detail prior to the touching motion over touchpads 4 and 5 corresponding to arrows 61 and 62, and FIG. 10 shows the map detail after this touching motion over touchpads 4 and 5.

If there is a touching motion over touchpad 5 in the direction of the arrow indicated by reference numeral 63 and simultaneously a touching motion over touchpad 4 in the direction of the arrow indicated by reference numeral 64, then the map detail is reduced. In this instance, FIG. 10 shows the map detail prior to the touching motion over touchpads 4 and 5 corresponding to arrows 63 and 64, and FIG. 9 shows the map detail after this touching motion over touchpads 4 and 5.

If there is a touching motion over touchpad 5 toward the left (that is, in the direction of arrow 61) and at the same time a touching motion over touchpad 4 toward the left (that is, in the direction of arrow 64), then the map detail is shifted to the left. If there is a touching motion over touchpad 5 toward the right (that is, in the direction of arrow 63) and at the same time a touching motion over touchpad 4 toward the right (that is, in the direction of arrow 62), then the map detail is shifted to the right. If there is a touching motion over touchpad 5 downward and simultaneously a touching motion over touchpad 4 downward, then the map detail is shifted downward. If there is a touching motion over touchpad 5 upward and simultaneously a touching motion over touchpad 4 upward, then the map detail is shifted upward.

Figure 12:
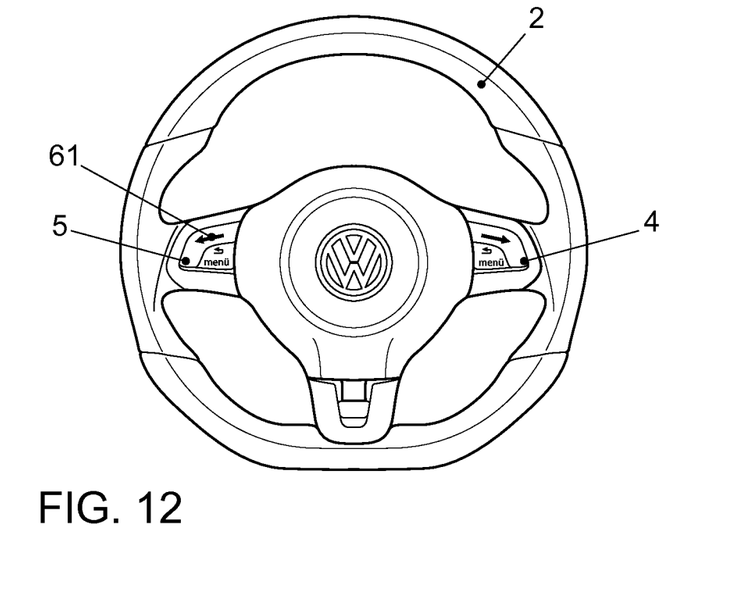
FIG. 12 shows the steering wheel represented in FIG. 2.
Figure 13:
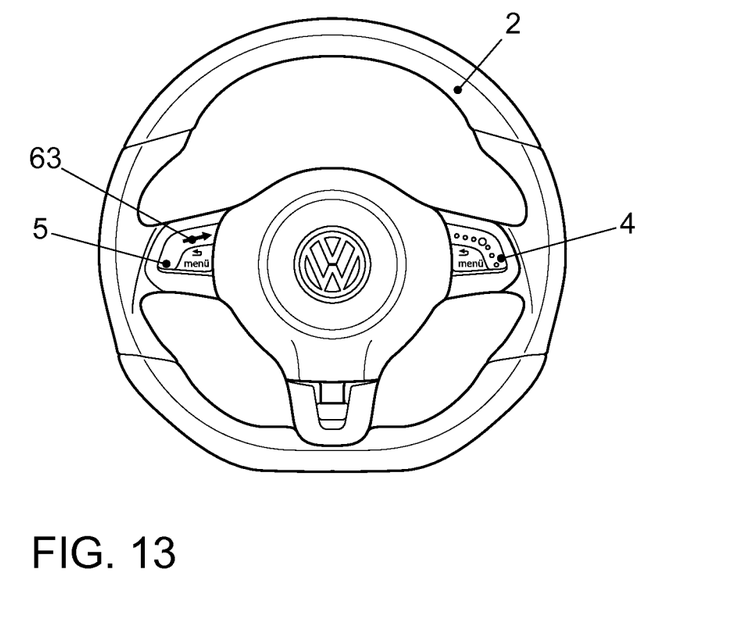
FIG. 13 shows the steering wheel represented in FIG. 2.
Figure 14:
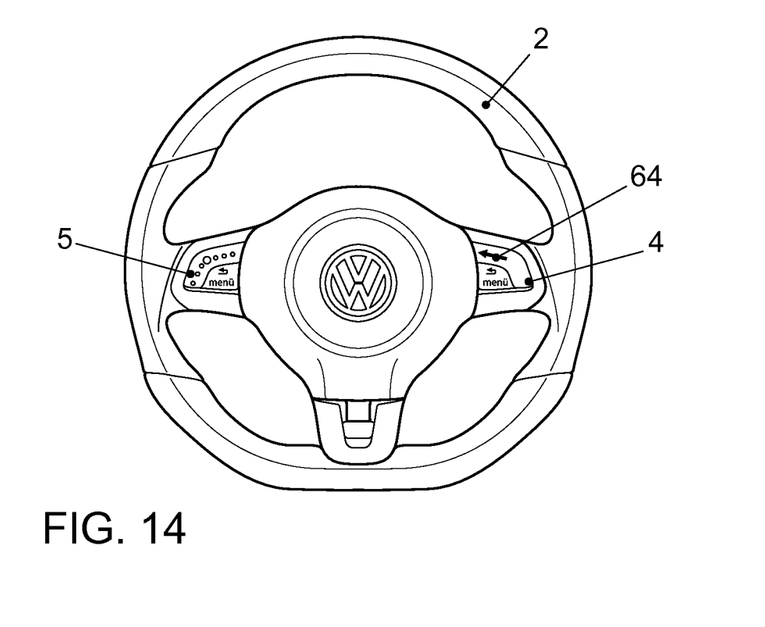
FIG. 14 shows the steering wheel represented in FIG. 2.
Figure 15:
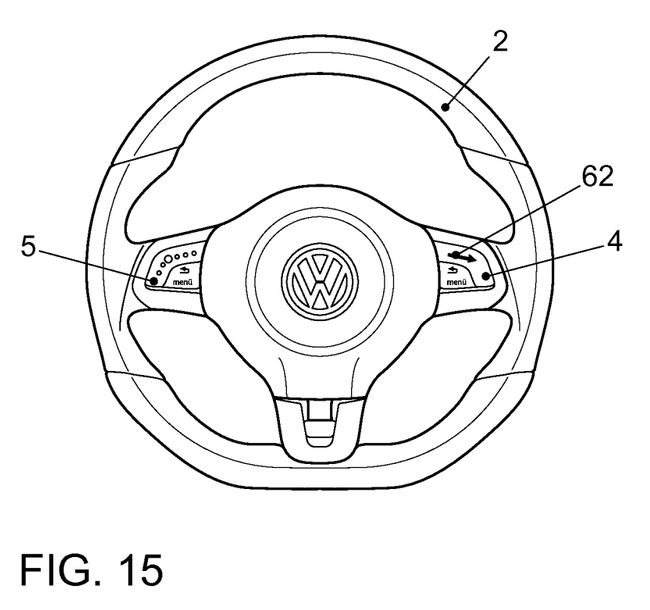
FIG. 15 shows the steering wheel represented in FIG. 2.

If a list is represented on the display for example, as shown in exemplary fashion in FIGS. 7 to 9 of German Published Patent Application No. 101 39 693, then it is possible to scroll through the represented lists by touching touchpads 4 and 5. If there is a touching motion over touchpad 5 toward the left for example—as shown in FIG. 12—without the occurrence of a touching motion over touchpad 4, then the action is one of scrolling toward the left or upward. If there is a touching motion over touchpad 5 toward the right for example—as shown in FIG. 13—without the occurrence of a touching motion over touchpad 4, then the action is one of scrolling toward the right or downward. If there is a touching motion over touchpad 4 toward the left for example—as shown in FIG. 14—without the occurrence of a touching motion over touchpad 5, then the action is one of scrolling toward the left or upward. If there is a touching motion over touchpad 4 toward the right for example—as shown in FIG. 15—without the occurrence of a touching motion over touchpad 5, then the action is one of scrolling toward the right or downward.

On the other hand, if there is a touching motion of touchpad 5 toward the left and simultaneously a touching motion of touchpad 4 toward the left, then the action is one of scrolling toward the left or upward at an increased speed. If there is a touching motion of touchpad 5 toward the right and simultaneously a touching motion of touchpad 4 to the right, then the action is one of scrolling toward the right or downward at an increased scrolling speed.

LIST OF REFERENCE CHARACTERS

1 Motor vehicle
2 Steering wheel
3 Display
4, 5 Touchpad
10 Control system
11 Mobile telephone
12 Bluetooth interface
13 Navigation system
14 Automatic climate control
15 Infotainment system
16 Vehicle control unit
19 Bus system
20 Channel
21, 22 Section
23 Curvature
24 Bulge
25, 26 Operating element
31, 32 Interface
33, 34 Evaluation module
35 Coordination module
41, 44, 45, 46,
48, 49, 51, 53,
54 Step
42, 43, 47, 52 Query
61, 62, 63, 64 Arrow
401, 501 LEDs
B Command
L Length
TP4, TP5 Output signal
W Width
α Angle of inclination with respect to the horizontal
β Angle of opening

What is claimed is:
1. A motor vehicle, comprising:
a steering wheel extending substantially within a plane;
a touchpad including a touch-sensitive surface adapted to input commands integrated into the steering wheel and situated in a channel extending substantially within the plane of the steering wheel; and
a control system having an interface operably connected to the touchpad, and an evaluation module operably connected to the interface to register a coordinate of a first touch on the touchpad, and to determine a type of the first touch;
wherein a course of the channel is (a) boomerang-shaped or (b) v-shaped, the touchpad is situated in a lateral region of the steering wheel, and no part of the touch pad is situated more than 15 cm from the edge of the steering wheel;

wherein the type of the first touch is at least one of: (i) a withdrawal away from the touchpad; (ii) a pressing motion on the touchpad; and/or (iii) a touching motion on the touchpad; and wherein the touchpad includes (a) a grain, (b) a surface structure, (c) a structure, or (d) a texture; and wherein (a) the grain, (b) the surface structure, (c) the structure, or (d) the texture includes at least one group of convex dents.

2. The motor vehicle according to claim 1, wherein the course of the channel includes a curvature in the plane that has an opening angle between 120° and 140°.

3. The motor vehicle according to claim 2, wherein the curvature opens downward when the steering wheel is directed straight ahead.

4. The motor vehicle according to claim 1, wherein the course of the channel includes a section that is inclined between 2° and 20° with respect to horizontal when the steering wheel is directed straight ahead.

5. The motor vehicle according to claim 1, wherein the channel is between 65 mm and 45 mm long.

6. The motor vehicle according to claim 1, wherein the channel is between 20 mm and 10 mm wide.

7. The motor vehicle according to claim 1, wherein (a) the grain, (b) the surface structure, (c) the structure, or (d) the texture is (a) rhombic, (b) square, or (b) rectangular.

8. The motor vehicle according to claim 7, wherein (a) the grain, (b) the surface structure, (c) the structure, or (d) the texture includes at least one group of dents.

9. The motor vehicle according to claim 1, wherein (a) the grain, (b) the surface structure, (c) the structure, or (d) the texture includes at least one group of bulges.

10. The motor vehicle according to claim 1, wherein the touchpad is arranged in a lateral region of the steering wheel.

11. The motor vehicle according to claim 1, wherein the touch-sensitive surface is a resistively touch-sensitive surface, or a capacitively touch-sensitive surface.

12. The motor vehicle according to claim 1, wherein the evaluation module is adapted to register a coordinate of a second touch on the touchpad such that a distance between the coordinate of the first touch and the coordinate of the second touch is detected.

13. The motor vehicle according to claim 12, wherein, if the distance is within a specific threshold value, the coordinates are stored in the evaluation module.

14. The motor vehicle according to claim 1, wherein the evaluation module is adapted to determine whether the first touch has been detected.

15. The motor vehicle according to claim 14, wherein the evaluation module is adapted to determine a type of the first touch including at least one of (i) a withdrawal from the touchpad; and/or (ii) a pressing action on the touchpad.

16. The motor vehicle according to claim 1, wherein the touch pad is adapted to input commands to control a wirelessly connected mobile telephone.

17. A motor vehicle, comprising:
a steering wheel extending substantially within a plane;
a touchpad including a touch-sensitive surface adapted to input commands integrated into the steering wheel and situated in a channel extending substantially within the plane of the steering wheel, a course of the channel including a curvature in the plane and a portion of the course of the channel extending radially; and
a control system having an interface operably connected to the touchpad, and an evaluation module operably connected to the interface to register a coordinate of a first touch on the touchpad, and to determine a type of the first touch;
wherein the course of the channel is (a) boomerang-shaped or (b) v-shaped, the touchpad is situated in a lateral region of the steering wheel, and no part of the touch pad is situated more than 15 cm from the edge of the steering wheel;
wherein the curvature opens downward when the steering wheel is directed straight ahead;
wherein the type of the first touch is at least one of: (i) a withdrawal away from the touchpad; (ii) a pressing motion on the touchpad; and/or (iii) a touching motion on the touchpad; and
wherein the touchpad includes (a) a grain, (b) a surface structure, (c) a structure, or (d) a texture; and wherein (a) the grain, (b) the surface structure, (c) the structure, or (d) the texture includes at least one group of convex dents.

18. The motor vehicle according to claim 17, wherein the course of the channel includes a first section and at least one second section separated by the curvature from the first section.

19. The motor vehicle according to claim 18, wherein the first section is inclined between 2° and 20° with respect to horizontal when the steering wheel is directed straight ahead.

20. The motor vehicle according to claim 18, wherein the first section is situated above the second section when the steering wheel is directed straight ahead.

21. The motor vehicle according to claim 18, wherein the first section is inclined between 120° and 140° with respect to the second section.

22. A motor vehicle, comprising:
a steering wheel extending substantially within a plane;
a first touchpad including a first touch-sensitive surface adapted to input commands integrated into the steering wheel and situated in a first channel extending substantially within the plane of the steering wheel, a course of the first channel being (a) boomerang-shaped or (b) v-shaped, the first touchpad is situated in a lateral region of the steering wheel, and no part of the first touch pad is situated more than 15 cm from the edge of the steering wheel; and
a second touchpad including a second touch-sensitive surface adapted to input commands integrated into the steering wheel, spatially separated from the first touchpad, and situated in a second channel extending substantially within the plane of the steering wheel, a course of the second channel being (a) boomerang-shaped or (b) v-shaped, the second touchpad is situated in a lateral region of the steering wheel, and no part of the second touch pad is situated more than 15 cm from the edge of the steering wheel; and
a control system having a first interface operably connected to the first touchpad, a second interface operably connected to the second touchpad, a first evaluation module operably connected to the first interface, and a second evaluation module operably connected to the second interface to register a coordinate of a first touch on at least one of the first and second touchpads, and to determine a type of the first touch;
wherein the type of the first touch is at least one of: (i) a withdrawal away from the at least one of the first and second touchpads; (ii) a pressing motion on the at least one of the first and second touchpads; and/or (iii) a touching motion on the at least one of the first and second touchpads; and wherein the first and second touchpads include (a) a grain, (b) a surface structure, (c) a structure, or (d) a texture; and wherein (a) the grain, (b) the surface structure, (c) the structure, or (d) the texture includes at least one group of convex dents.

23. The motor vehicle according to claim 22, wherein the course of the first channel is in a mirror image to the course of the second channel.

24. The motor vehicle according to claim 22, wherein the first touchpad is arranged in a left lateral region of the steering wheel.

25. The motor vehicle according to claim 24, wherein the course of the first channel includes a curvature that opens to the right downward when the steering wheel is directed straight ahead.

26. The motor vehicle according to claim 22, wherein the second touchpad is arranged in a right lateral region of the steering wheel.

27. The motor vehicle according to claim 26, wherein the course of the second channel includes a curvature that opens to the left downward when the steering wheel is directed straight ahead.

28. The motor vehicle according to claim 22, further comprising a coordination module adapted to generate a command to operate a function of the motor vehicle as a function of a touch motion over the first touchpad and a simultaneously-occurring touch motion over the second touchpad.

29. The motor vehicle according to claim 22, wherein the first touch-sensitive surface is a resistively touch-sensitive surface, or a capacitively touch-sensitive surface, and the second touch-sensitive surface is a resistively touch-sensitive surface, or a capacitively touch-sensitive surface.

\* \* \* \* \*